United States Patent [19]

Hallerbäck

[11] 4,107,560

[45] Aug. 15, 1978

[54] ELECTRIC MACHINE

[75] Inventor: Stig Lennart Hallerbäck, Vastra Frolunda, Sweden

[73] Assignee: SKF Industrial Trading and Development Company B.V., Lutphass, Netherlands

[21] Appl. No.: 629,380

[22] Filed: Nov. 6, 1975

[51] Int. Cl.² .............................................. H02K 9/16
[52] U.S. Cl. .................................... 310/60 R; 310/64
[58] Field of Search ........................ 310/58, 59, 66, 69, 310/65, 216, 217, 218, 214, 25 A

[56] References Cited

U.S. PATENT DOCUMENTS

| 1,285,398 | 11/1918 | Rüdenberg | 310/64 X |
| 2,447,339 | 8/1948 | Hoover | 310/64 |
| 3,515,916 | 6/1970 | Kovacs | 310/65 |
| 3,821,568 | 6/1974 | Gillet | 310/214 X |
| 3,932,929 | 1/1976 | Hallerback et al. | 310/254 X |

Primary Examiner—Donovan F. Duggan
Attorney, Agent, or Firm—Eugene E. Renz, Jr.

[57] ABSTRACT

A dynamoelectric machine wherein rotor cooling is effected by cooling channels located in the stator structure.

9 Claims, 5 Drawing Figures

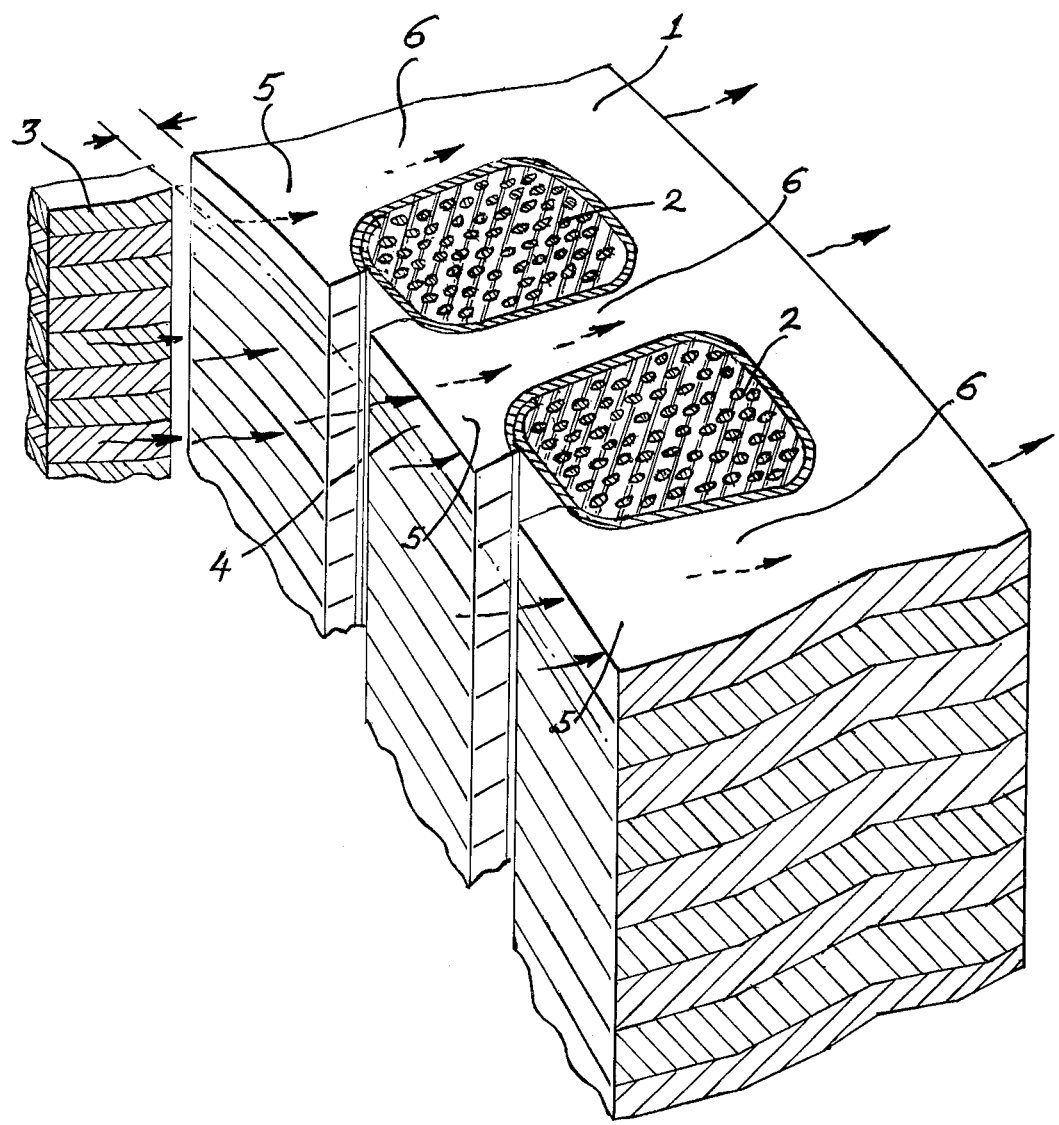
FIG. IA

ELECTRIC MACHINE

The present invention relates to electric machines comprising a stator and a rotor and concerns more specifically a means of cooling the machine.

Conventional electric machines consist principally of a stator, in which a rotor is arranged and rotatably journalled in the stator or its casing via bearings and bearing supports. Both the stator and the rotor are usually built up by laminations, which are tightly packed and arranged perpendicularly to the axial direction. Current leads are further arranged in the stator and the rotor.

A motor as described above has a limited capacity which primarily depends on the heat generated in both the rotor and the stator, which heat in some way must be conducted away. The heat that is generated in the stator gives less trouble as the stator is easy to cool, e.g., by arranging a surrounding jacket for water cooling. The rotor, however, must dissipate almost all of its generated heat by radiation from its cylindrical outer surface to the cylindrical inner surface of the stator. Only a small part, about 10–20%, of the rotor heat dissipates via the rotor shaft or the ends. The reason that so little heat goes out through the rotor ends is of course that the laminations are isolated to each other so that any effective heat transport between the laminations cannot occur.

Any cooling of the rotor through the air surrounding the cylindrical surface does not normally occur. This depends on the fact that the distance between the rotor and the stator, which always is maintained as small as possible, only is of the size of some tenths of a millimeter, which means that any cooling amount of air cannot get room in that narrow space.

The most predominating part of the rotor heat must consequently radiate out via the cylindrical surface and be absorbed by the stator teeth. Any heat transport between the stator teeth does not exist, as heat generating windings are arranged and usually surrounded by an isolation of plastic. The heat absorbed in the stator teeth must be transported via the iron lamination and out to the surroundings.

According to the present invention one has solved the above problem of cooling the interior of the stator and brought about an electric machine that comprises a stator and a rotor having axially running laminations in the stator and having arranged cooling means between the laminations in the vicinity to the rotor cavity.

Accoring to an embodiment of the invention these cooling means consist of rods of heat conducting material, such as aluminum. It is preferable that the rods protrude out of the laminations and that the ends of the rods are cooled by air. It is also possible to arrange the cooling means as axially running cavities for air streams, which cavities are closed towards the rotor cavity. These cavities may be defined by pipes, which preferably protrude outside of the laminations. They may also be defined towards the rotor cavity by plates.

In one embodiment the pipe ends at one side of the stator can be open inwards, towards the rotor cavity and at the other side open outwards from the rotor cavity. In this way a controlled air stream through the stator is obtained. The invention will in the following be described more in detail in connection with the attached drawings, in which:

FIG. 1 schematically shows the end of a stator according to the invention. FIG. 1a is a fragmentary perspective view of a conventional stator and a portion of a rotor;

Figure 1:
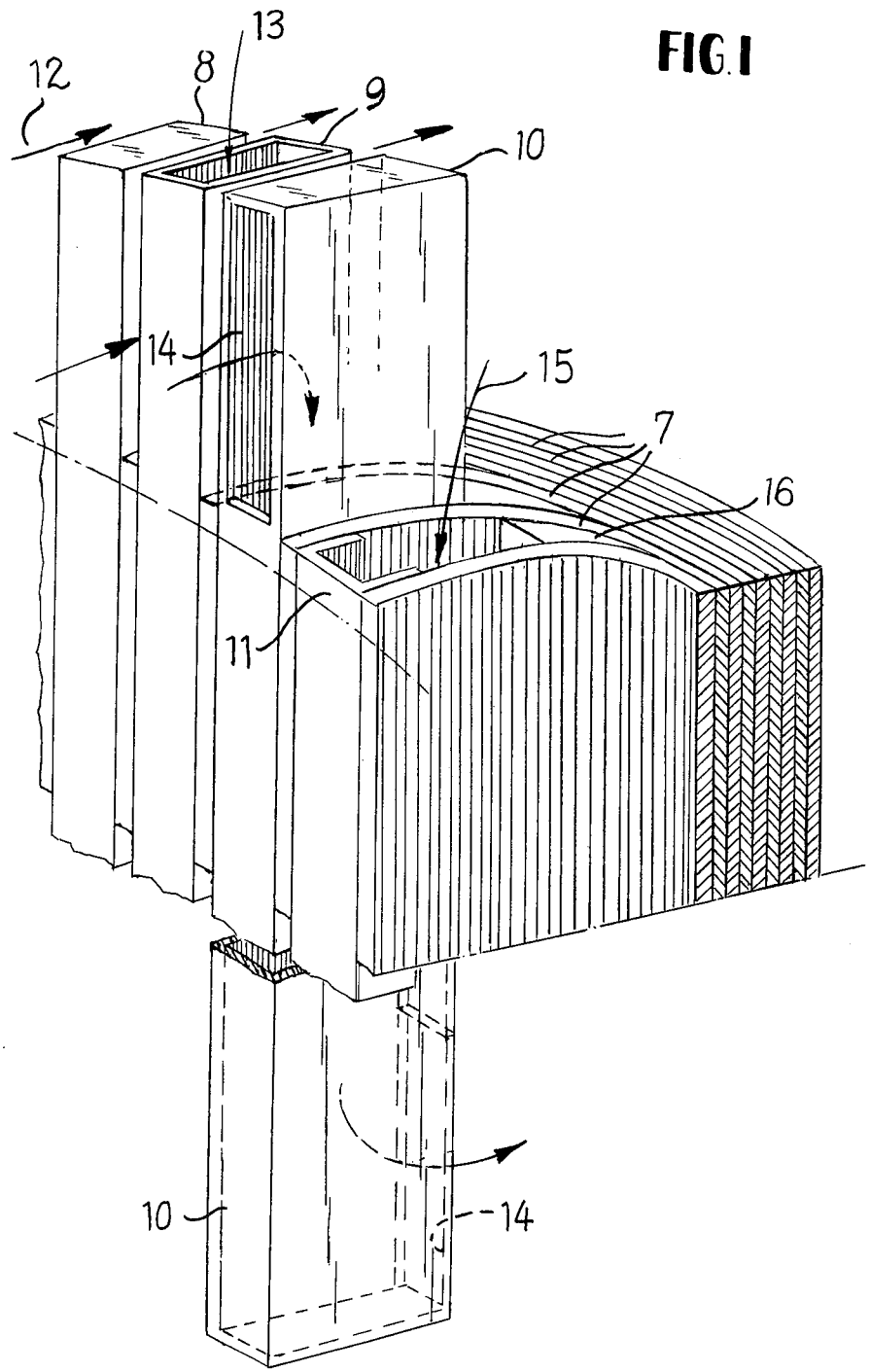
Figure 3:
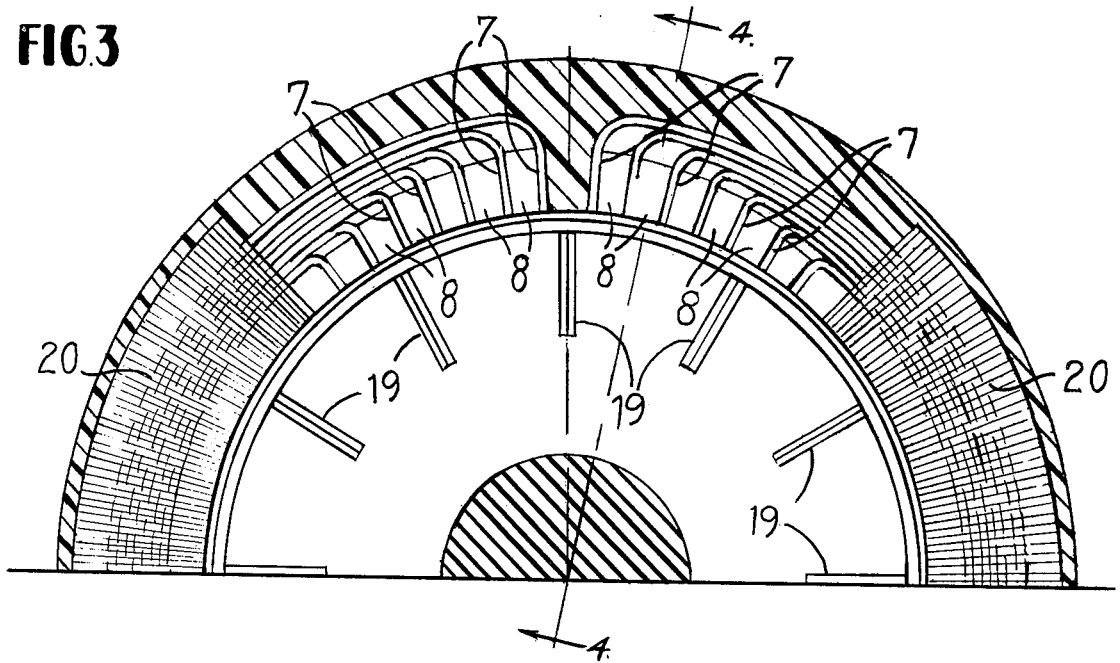
FIG. 3 is a sectional view through the stator showing the lamination configuration of FIG. 2.
Figure 4:
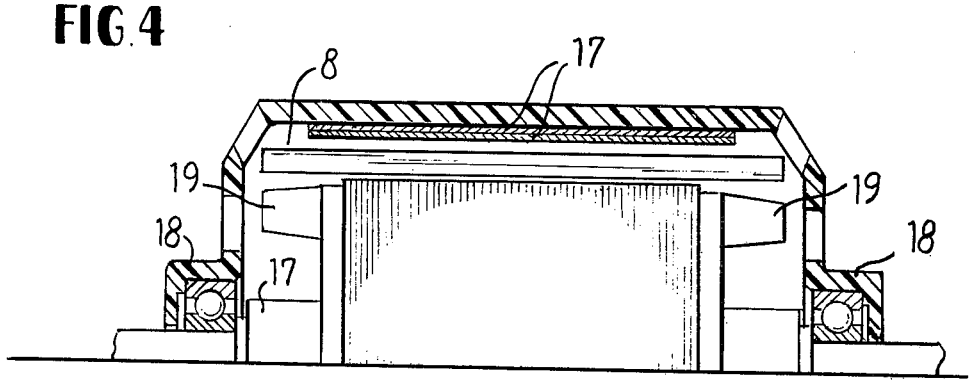
FIG. 4 is a sectional view taken on line 4—4 of FIG. 3.

In FIG. 1a a conventional stator end is shown. The stator is as appears built up by laminations 1, through which windings 2 are arranged. The heat from the rotor 3, which also consists of laminations, dissipates out towards the stator and has to radiate through the air gap 4 into the stator teeth 5 as shown by the arrows. Any heat absorbtion between the teeth does not occur and the heat which is absorbed at the surfaces of the stator teeth must be transported via a narrow distance 6 out to the yoke, which badly influences the heat transport. In FIG. 1 four embodiments of the invention are shown and for simplicity arranged in one and the same stator. This consists of axially running laminations 7, which have been bent towards the rotor cavity see FIGS. 3 and 4. The windings around the yoke parts have been left out of the drawings for making the view simpler.

As appears from the drawing rods 8, pipes 9 and 10 or plates 11 have been arranged between the ends of the laminations in the vicinity to the rotor cavity. The rod ends 8 protrude out outside the stator end and are subjected to air currents 12. The heat that partly has been generated in the stator, partly generated in the rotor and radiated over to the stator is thereby transported axially out from the stator. One should then observe that all the inner sides of the stator towards the rotor cavity is covered by heat conducting laminations, so that the radiation receiving surface is maximally large.

Instead of the rods 8 pipes 9 may be arranged. These pipes can of course act as heat transporters and be cooled from outside in the same way as the rods 8. A more effective cooling, however, will occur if air is blown through the pipes, such as implied by the arrow 13.

The pipes may be shut at the ends but instead having an opening 14 towards the rotor cavity, such as is shown in connection with the pipe 10. If any air current shall occur in this case the second opening 14 at the other end of the pipe must be directed outwards from the rotor cavity. Through such an arrangement natural convection occurs due to the influence from the blower wings. If desired, the holes may alternately be arranged so that the pipes get alternately counter flows.

The perhaps simpliest embodiment of the invention consists in having the openings of the lamination ends covered by plates 11. By blowing an air current 15 through the cavity approximately the same function as in connection with the pipes 9 and 10 will be obtained. The inner side of the cavity is preferably defined by plastic 16, which is the bounding substance for the stator.

Figure 2:
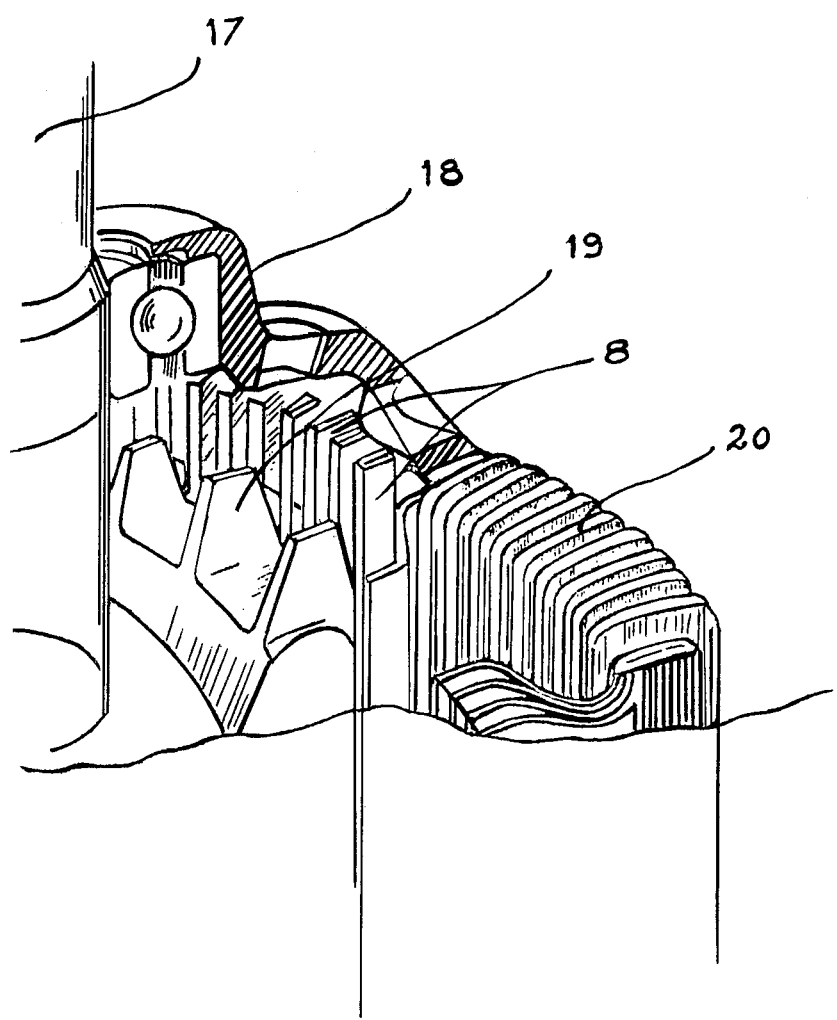
FIG. 2 shows a perspective view of an embodiment according to the invention.

In FIG. 2 that embodiment of the invention is shown where heat conducting rods 8 are used for the cooling. In the figure the rotor shaft 17, the bearing support 18 with apertures for the air stream, fan wings 19 and windings 20 around the yoke part of the laminations 7 are further shown.

The advantages with the present invention are evident. Firstly, the radiation of the heat from the rotor to the stator is improved by a larger radiation receiving surface and more effective cooling of the same; secondly, the heat transport is appreciably improved through the fact that the heat is conducted in axial direction direct out from the inner part of the stator. In this way a much higher effect can be taken out of a given electric machine compared to a corresponding conventional one as the limiting factor, namely the temperature in the bearings and the winding isolation will be appreciably lower.

The invention is not limited to the embodiment examples shown but can be varied in different ways within the scope of the claims.

I claim:

1. Electric machine comprising a stator and a rotor mounted in a rotor cavity in the stator, said stator including a plurality of axially extending laminations having a radially directed, circumferentially spaced end portions, the outer terminal edges of said end portions lying on the circumference of a common circle defining the rotor cavity, and means defining an axially directed cooling channel in at least one of the spaces between said lamination end portions in close proximity to the rotor cavity said means comprising longitudinal pipes having cavities for air streams said pipes protruding beyond the axial ends of the laminations, the pipe ends at one side of the stator having apertures facing inwards towards the rotor cavity and at the other side having apertures facing outwards from the rotor cavity.

2. Electric machine comprising a stator and a rotor, said stator having a plurality of axially extending laminations, cooling means comprising longitudinal cavities for air streams, which cavities are closed towards the rotor cavity and defined by pipes protruding out of the lamination, said pipe ends at one side of the stator having apertures facing inwards toward the rotor cavity and at the other side apertures facing outwards from the rotor cavity.

3. Electric machine comprising a stator and a rotor mounted in a rotor cavity in the stator, said stator including a plurality of axially extending laminations having a radially directed, circumferentially spaced end portions constituting pole parts, the outer terminal edges of said end portions lying on the circumference of a common circle defining the rotor cavity, said stator lamination between the pole parts constituting a yoke part remote from the rotor cavity for windings, and means defining an axially directed cooling channel in at least one of the spaces between said lamination end portions in close proximity to the rotor cavity and including a wall portion directly confronting said stator.

4. Electric machine according to claim 3 including a plurality of cooling channels in said spaces and characterized in that said cooling channels consist of hollow rods of heat conducting material, such as aluminum.

5. Electric machine as claimed in claim 4 wherein said rods project axially beyond the ends of the laminations and wherein said rotor includes fan means for directing cooling air against the exposed terminal end portions of said rods.

6. Electric machine according to claim 3 characterized in that the cooling means comprise longitudinal cavities for air streams which cavities are closed towards the rotor cavity.

7. Electric machine according to claim 6 characterized in that the cavities are defined by pipes (9,10).

8. Electric machine according to claim 6 characterized in that the cavities are closed against the rotor cavity by means of plates (11).

9. Electric machine according to claim 6 characterized in that the pipes (9,10) protrude out of the laminations (7).

* * * * *